Oct. 21, 1924.

H. D. MORTON 1,512,789

ELECTRIC ARC WELDING MACHINE AND METHOD OF OPERATING THE SAME

Filed May 8, 1924   6 Sheets-Sheet 1

INVENTOR.
Harry D. Morton
BY
Gifford & Scull
his ATTORNEYS.

Oct. 21, 1924. 1,512,789
H. D. MORTON
ELECTRIC ARC WELDING MACHINE AND METHOD OF OPERATING THE SAME
Filed May 8, 1924 6 Sheets-Sheet 5

INVENTOR.
Harry D. Morton
BY Gifford & Scull
ATTORNEYS.

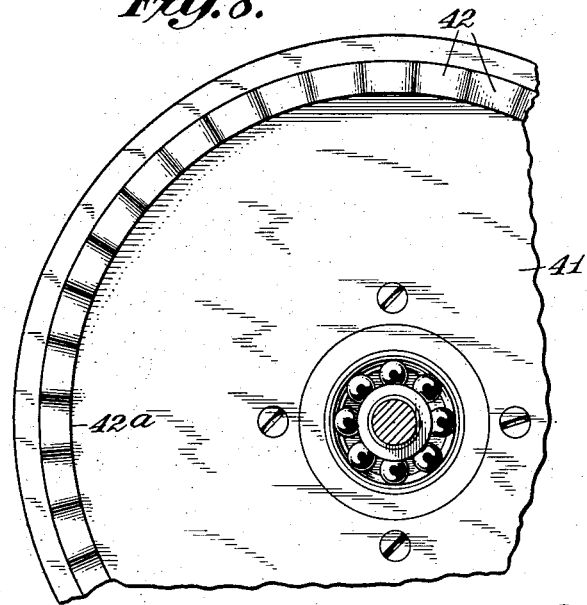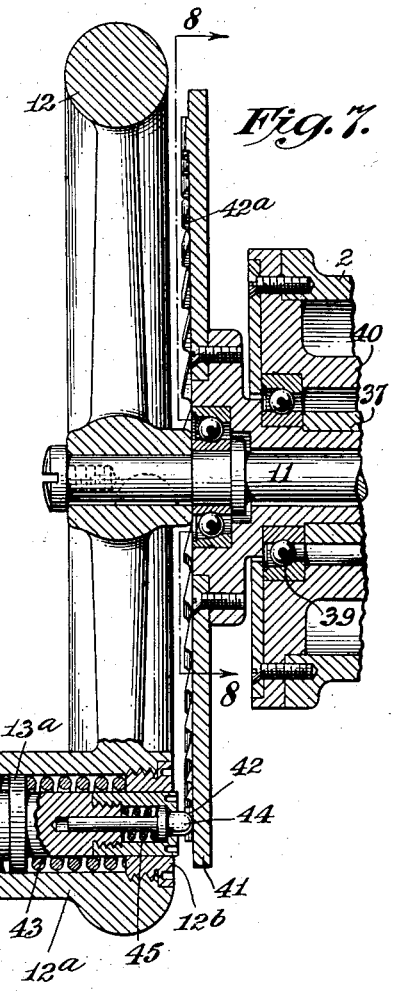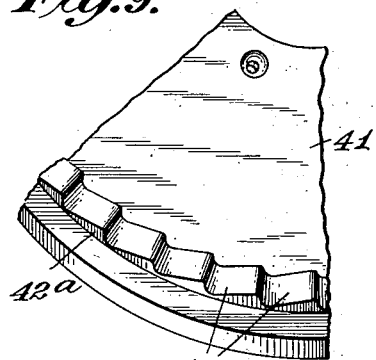

Patented Oct. 21, 1924.

1,512,789

UNITED STATES PATENT OFFICE.

HARRY D. MORTON, OF NEW YORK, N. Y.

ELECTRIC-ARC-WELDING MACHINE AND METHOD OF OPERATING THE SAME.

Application filed May 8, 1924. Serial No. 711,773.

*To all whom it may concern:*

Be it known that I, HARRY D. MORTON, a citizen of the United States, residing in the city of New York, in the county of New York and State of New York, have invented certain new and useful Improvements in Electric-Arc-Welding Machines and Methods of Operating the Same, of which the following is a specification.

The following is a description of an electric arc welding machine and the method of operating the same embodying my invention in the form and manner at present preferred by me; but it will be understood that various modifications and changes may be made without departing from the spirit of my invention and without exceeding the scope of my claims.

Figure 1:
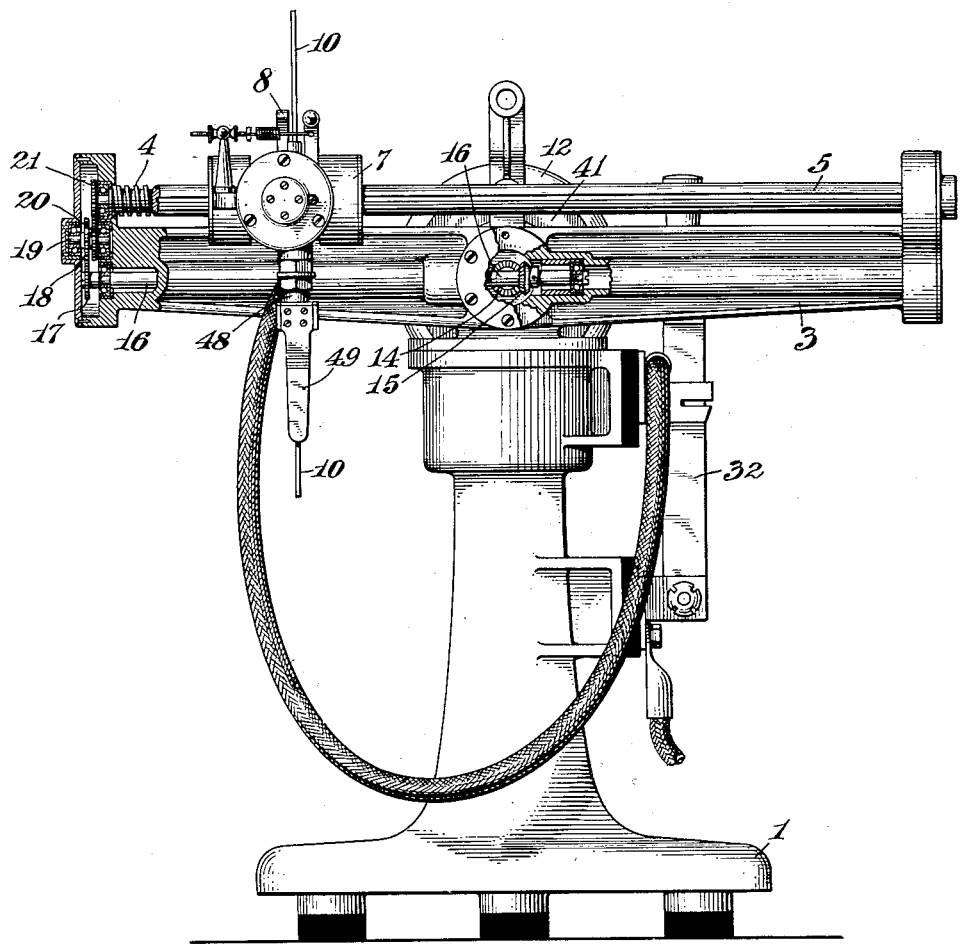
Figure 2:
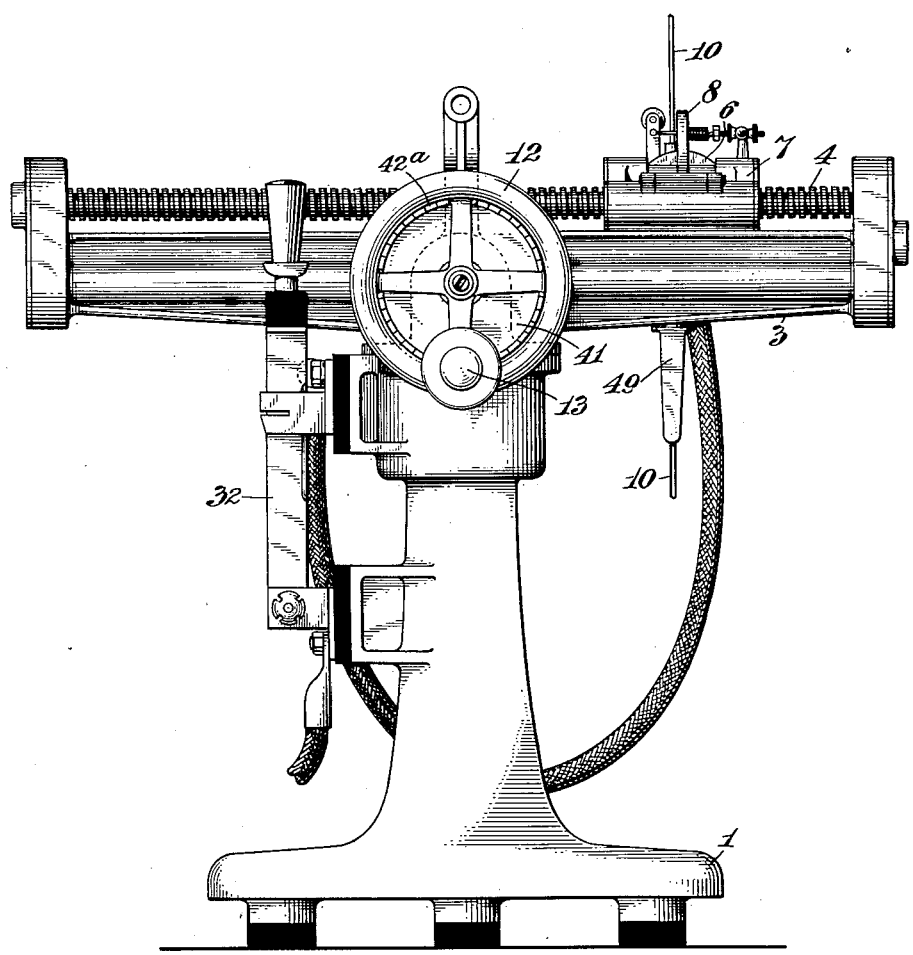
Figure 3:
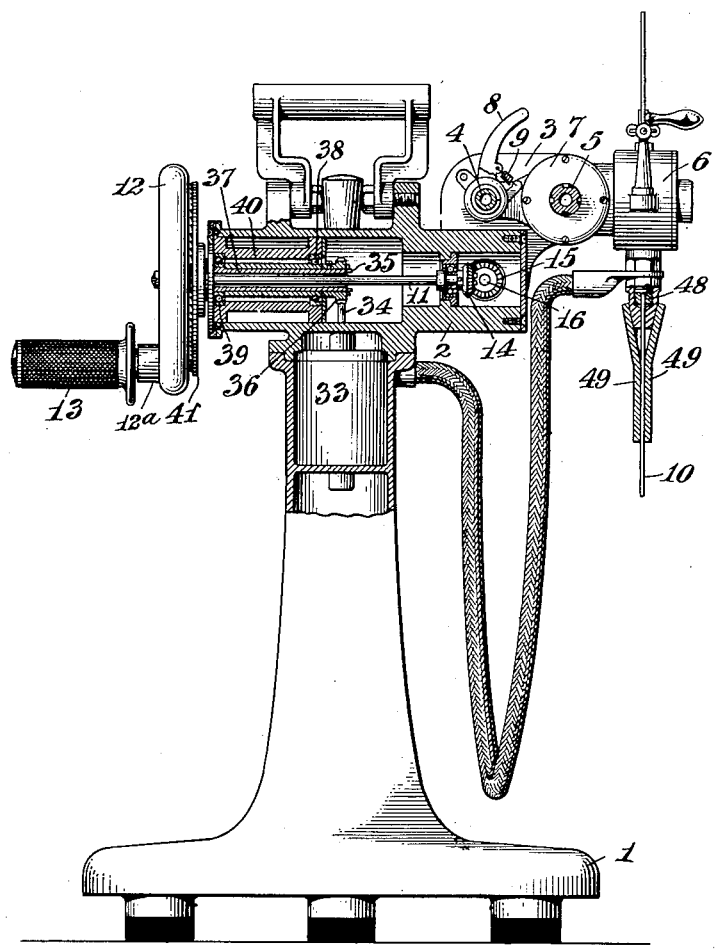
Figure 4:
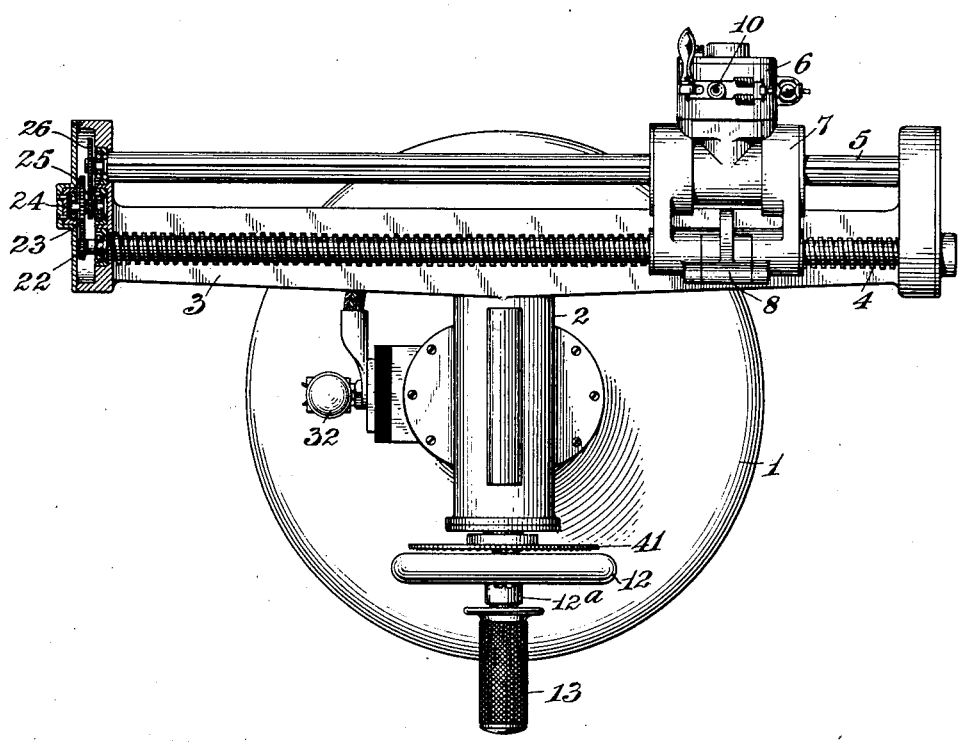
Figure 10:
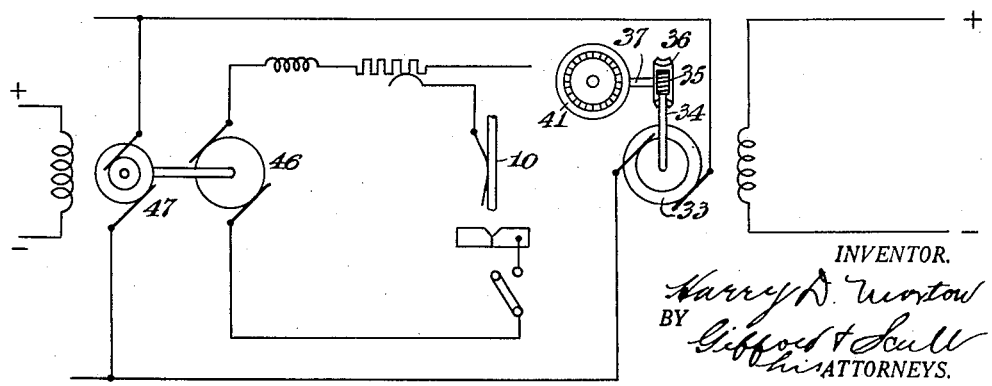
Figure 5:
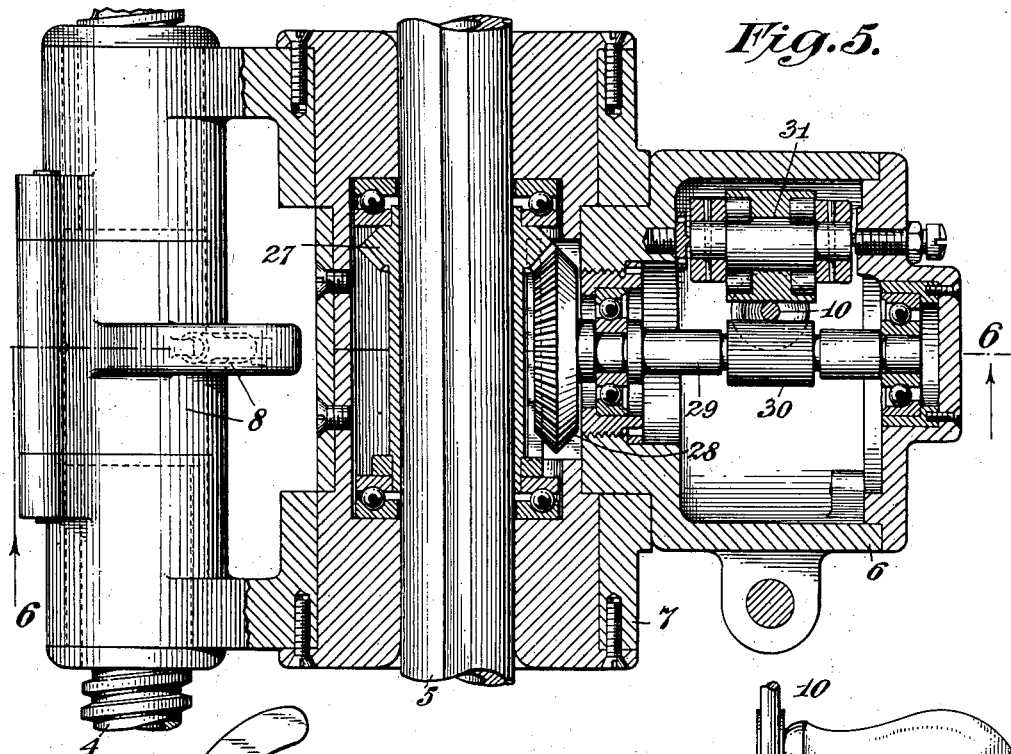
Figure 6:
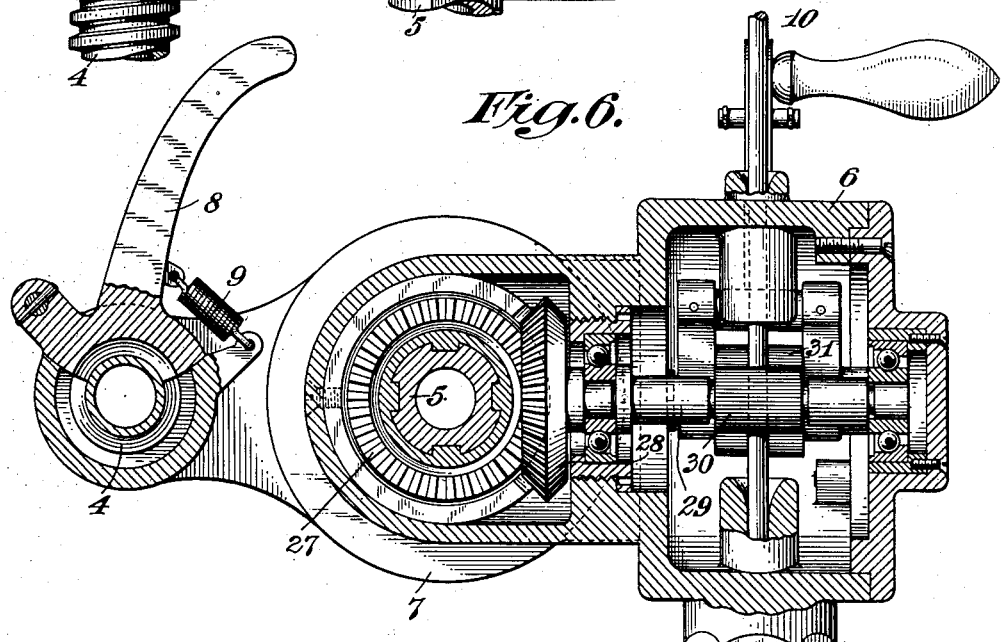

My invention will best be understood by reference to the accompanying drawings, in which I have illustrated the preferred form of device for carrying out my invention, and in which Fig. 1 shows a front elevation of the machine, partly in section; Fig. 2 shows a rear elevation of the machine; Fig. 3 shows a side elevation, partly in section; Fig. 4 is a plan view; Fig. 5 shows, on a larger scale, a plan view of a welding head and supporting means, partly in section; Fig. 6 is a transverse section of the parts shown in Fig. 5 taken along the plane of the line 6—6 in Fig. 5; Fig. 7 shows means for manually actuating the device; Fig. 8 is a fragmentary plan view of a portion of a timing device which may be used in conjunction with the manual actuating means; Fig. 9 is a fragmentary perspective view of a portion of the timing disk of Fig. 8; and Fig. 10 is a wiring diagram illustrating an electrical system which may be employed in conjunction with the machine.

Like reference characters indicate like parts throughout the drawings.

Referring to the drawings, the device is supported upon base 1, preferably formed of heavy material, such as cast iron, in order to afford a substantial foundation. Secured to this base is a cylindrical member 2 (Fig. 3), carrying a girder structure 3 (Fig. 1), supporting in suitable bearings a lead screw 4 and keywayed shaft 5 (Fig. 4). Mounted upon said shafts is a yoke 7 supporting a welding head 6. The lower end of member 8, hinged in said yoke, forms a nut engaging the threads of lead screw 4 when said hinged member is held by spring 9 in the position shown in Figs. 3 and 6. In this manner, rotation of lead screw 4 causes yoke 7 and welding head 6 to move in a path adjacent to work to be welded. Rotation of keywayed shaft 5 produces, in a manner hereinafter to be described, a feeding of welding pencil 10. Mounted in suitable bearings in cylindrical member 2 is shaft 11 (Fig. 3), carrying at its left-hand end the hand-wheel 12, adapted to be manually rotated by handle 13. The opposite end of shaft 11 carries mitre gear 14, meshing with and driving mitre gear 15, mounted on shaft 16 (Fig. 1), carrying at its opposite end spur gear 17, meshing with and driving spur gear 18, mounted on idler shaft 19, which also carries spur gear 20, meshing with and driving spur gear 21, mounted on one end of lead screw 4. Mounted on the opposite end of lead screw 4 is a spur gear 22 (Fig. 4) meshing with and driving spur gear 23, mounted on idler shaft 24, which also carries spur gear 25, meshing with and driving spur gear 26, mounted on keywayed shaft 5. Slidably mounted on keywayed shaft 5, keyed thereto and rotating therewith, is mitre gear 27, meshing with and driving mitre gear 28 (Fig. 5), mounted on shaft 29, carrying driving feed roll 30, between which and idler feed roll 31, welding pencil 10 is gripped for feeding. In this manner, manual rotation of hand-wheel 12 causes welding head 6 to move along the track, and simultaneously produces feeding of welding pencil 10. A switch 32 in the welding circuit is conveniently located on base 1.

The machine is adapted to be placed adjacent to work to be welded, and, when so positioned, an arc is struck between the lower end of welding pencil 10 and the work (not shown), by manually feeding the pencil into contact with the work and then reversing the direction of rotation of hand-wheel 12, or in any other manner well known to those skilled in the art. Thereafter, the operator continues to rotate the hand-wheel, causing the welding pencil to be fed toward the work and the arc to traverse the work. When the weld is completed, the operator ruptures the arc by discontinuing the feeding or by opening the welding switch. He then disengages the nut portion of hinged member 8 (Fig. 6) from the threads of lead screw 4, and moves the welding head to the opposite end of the lead screw, preparatory to making another weld.

Mounted in the upper portion of base 1 is motor 33, (Fig. 3), the armature shaft 34 of which carries a worm 35, meshing with and driving a worm gear 36, attached to tube 37, mounted in bearings 38 and 39, carried in housing 40, which is located in the left-hand end of cylindrical member 2. At the left-hand end of tube 37 is mounted a disk 41, having a plurality of notches 42—42, preferably formed upon an annular flange 42ª on the face of said disk. Handle 13 is slidable in a boss 12ª integral with hand-wheel 12, whereby it can be manually moved toward disk 41, being retracted from said disk by spring 43 (Fig. 7) interposed between the end of a screw-threaded member 12ᵇ in the end of the boss 12ª, and a collar 13ª formed on the shaft 13ᵇ in the handle 13. Slidably mounted in the right hand end of the shaft of handle 13 is detent 44, which, by manual movement of the handle, may be brought into slight contact with the notches 42—42 of disk 41, without, however, forming a driving connection therebetween. As appears from Fig. 7, detent spring 45 normally forces detent 44 to the right, but not sufficiently to bring the same into engagement with the notches 42 unless the handle 13 is manually pressed to the right against the action of the spring 43, as shown in Fig. 7. Disk 41 rotates continuously throughout the welding operation, and its speed is such that, with the proper gear ratios between shaft 11, lead screw 4, and key-wayed shaft 5, it constitutes a timer or master speed device whereby the operator can gauge the rate at which it is necessary for him to ordinarily manually rotate the hand-wheel 12 in order to maintain the desired arc length and rate of traverse of the arc over the work. Thus, manually rotating the hand-wheel 12 at the same rate as the arbitrary rate of speed of the revolving disk will, with the proper gear ratios and in conjunction with the arc control employed, result in the production of uniformly satisfactory welds. This correlation of the rate of manual rotation of the hand-wheel with the rate of rotation of the disk is accomplished by moving handle 13 toward disk 41, whereby detent 44 engages one of the grooves 42—42 in said disk. Failure of the operator to rotate the hand-wheel at the same rate as the rate of rotation of the timer disk causes the disk to force the detent out of one such groove and spring 45 soon thereafter brings it into another such groove. As appears from Fig. 9, one side of each such groove is curved to conform generally to the shape of the end of the detent 44, while the opposite side of said groove is tapered. If the operator rotates the hand-wheel 12 at a higher speed than that of timer disk 41, there is a slight resistance as the detent leaves each of the successive grooves. If, on the contrary, he rotates the hand-wheel at a speed lower than that of the timer disk, the detent rides easily and with less noticeable resistance up the tapered side of the groove, and spring 45 carries it with appreciable force to the bottom of the next groove. Thus, by turning of the hand-wheel at a speed higher than that of the timer disk produces a succession of resistances between the disk and the detent, but without appreciable clicking; whereas, turning of the hand-wheel at a speed lower than that of the timer disk produces a succession of clicks with less appreciable resistances. The operator is thus apprised, through his sense of touch, when he is turning the hand-wheel at a rate too high or too low, and he thereupon corrects the rate of rotation accordingly. He soon acquires the necessary skill to maintain the parts in the correct position, thereby enabling him to rotate the hand-wheel at the same speed as that of the timer. It is well understood that depressions and elevations occur in the work. When these depressions or elevations are so great in extent that the arc control method employed in connection with the machine cannot correct therefor, the operator accelerates or decelerates his manual feeding rate independently of the rate of rotation of the timer to meet the requirements of such conditions. In this case, his feeding rate may be gauged by visual observation of the arc length, which, in conjunction with the arc control method, permits of maintaining the arc within operative limits.

I may employ in conjunction with the present invention the welding system disclosed in my Letters Patent No. 1,483,612, dated February 12, 1924, wherein the arc is controlled by the direct action of its fusing energy. Such a system is illustrated in Fig. 10, wherein the constant potential welding generator 46 is driven by the synchronous motor 47; and the motor 33 which drives the timer 41 is also of the synchronous type, thus resulting in the rotation of the disk at a constant rate. The method of control herein disclosed is more fully described in my aforesaid patent, to which reference may be made. Briefly, however, it may be stated that when the arc tends to shorten, the wattage available at the arc increases, causing the welding pencil to fuse more rapidly, thus tending to restore the arc to its normal length. Conversely, when the arc tends to lengthen, the wattage available at the arc decreases, causing the welding pencil to fuse more slowly, and thereby tending to restore the arc to its normal length.

I preferably employ with this invention means comprising an electrode guide 48, having metallic spring contacts 49—49 (Fig. 3) for conveying current to the electrode 10 at a point close to the arc. I am thereby enabled to utilize a much higher current density in the electrode than is possible in the present manual welding method, thus greatly accelerating the speed of welding. I have found that by this means I can successfully employ a current density in excess of 30,000 amperes per square inch, whereas, in the ordinary manual welding process, the maximum density which can be used is of the order of 8,000 to 10,000 amperes per square inch.

In my pending applications, Serial No. 186,238 and No. 686,537, as well as in my Letters Patent No. 1,278,985 dated September 17, 1918, and in my aforesaid Letters Patent No. 1,483,612, dated February 12, 1924, I have disclosed arc welding machines wherein electrode material is automatically fed to the arc, and the work is automatically moved to the arc, or the arc is automatically moved over the work. Such machines are highly useful for the duplication of a large number of identical welds, particularly those in relatively small articles which can readily be rotated or otherwise moved to the arc. For work of this nature, and with suitable means for controlling the arc, it is entirely feasible to eliminate the skill and intelligence of the operator, and permit the welding operation to be carried out automatically. Indeed, it is possible, under these conditions, to have one attendant supervise the operation of a number of automatic machines, thereby effecting a large saving in labor cost. However, these automatic arc welding machines are necessarily quite complicated, particularly as to arc-striking and arc-stopping features, and therefore expensive to manufacture and likely to get out of order. They are less adaptable to miscellaneous use than is the manual welding process, especially in the large field of welding heavy immovable objects, widely diversified in form and lacking in uniformity as to welding requirements. Most welding of this nature is carried out manually, the operator feeding to the arc a welding electrode clamped in a handle which he holds in his hand, and simultaneously traversing the arc over the work. The results are unsatisfactory, for the reason that the operator has no means for controlling the arc, a very slight lengthening of which produces what is commonly termed "burned metal," resulting in low tensile strength and an almost entire lack of ductility in the weld. Because he has no standard or indicator by which to gauge the correctness of the rate of electrode feed or of the traverse of the arc over the work, the most skilled operator is never able to maintain a constant arc, but can only, by very close observation, note that the arc length has changed, and then endeavor to correct his feeding rate. Long experience is required before even a reasonable degree of proficiency can be attained. With my present invention I obtain the advantage which the manual welding process possesses of being adaptable to use on widely-varying classes of stationary objects, combined with the advantage of control of the arc—which latter feature enables the operator to constantly maintain a short arc and to produce uniformly perfect results. Additionally, by reason of being able, with my device, to use a much higher current, he can weld far more rapidly than is possible with the present manual welding method—the increase in speed being from 500% to 1,000%, depending upon the character of the work. Moreover, in the usual manual welding process the operator can feed only a few inches of the short welding wire which he employs, when he must rupture the arc and again clamp the wire in the handle at a higher point. With my device, the welding wire may be of indefinite length, and, as it is continuously fed, there need be no rupture of the arc during the progress of travel of the welding head across the track.

These desirable features I combine in a machine which is not complicated, and is therefore relatively inexpensive to manufacture and unlikely to get out of order. By eliminating many of the parts required in an automatic machine, the device becomes light in weight and readily portable for use on stationary work. Moreover, the movements required of the operator are very simple and easily learned, thus making it unnecessary to employ highly skilled labor in the application of the machine to miscellaneous welding.

What I claim as new and desire to secure by Letters Patent of the United States is:

1. In electric arc welding, means for manually feeding electrode material to an arc, a master speed device, and means whereby the operator may correlate the feed of the electrode material to the arc to said master speed device.

2. In electric arc welding, means for manually feeding an electrode to an arc, a master speed device operating at a definite rate, and means whereby the operator may correlate the rate of feed of the electrode to the rate of speed of said device.

3. In electric arc welding, manually operable means for feeding an electrode to an arc, and means affecting the operator's sense of touch whereby the electrode may be fed at a predetermined rate.

4. In electric arc welding, means for feeding electrode material to the arc and an indicator for said feeding means rotating at a rate corresponding to the feeding rate required to produce a substantially constant arc length.

5. In electric arc welding, means for manually feeding electrode material to the arc and a continually operating speed indicator for said feeding means.

6. In electric arc welding, manually operable means for feeding electrode material to the arc, a master speed device, and means for synchronizing the speed of the feeding means with said device.

7. In electric arc welding, manually operable means for feeding electrode material to the arc, automatically rotating means, and means for correlating the rate of feed of the electrode material to the speed of said rotating means.

8. The method of electric arc welding wherein a welding pencil constitutes one electrode and the work constitutes the other electrode which consists in striking an arc between said electrodes, manually feeding one electrode toward the other, and correlating the rate of feed to the rate of movement of a master speed device.

9. In electric arc welding, a welding circuit, electrodes in said circuit, manually operable means for feeding an electrode to an arc struck between said electrodes, manually operable means for traversing said arc over one of said electrodes, and automatic means for indicating to the operator the desired rate of feeding of the electrode and of traversing said arc.

10. In electric arc welding, manually operable means for feeding electrode material to the arc, and a motor-driven master speed device for guiding the operator in the rate of feeding.

11. In electric arc welding, manually operable means for feeding electrode material to the arc, and a rotating speed indicator for guiding the operator in the rate of feeding.

12. In electric arc welding, manually operable means for feeding electrode material to the arc, a rotating speed indicator for guiding the operator in the rate of feeding, and means for controlling the arc by the direct action of its fusing energy.

13. In electric arc welding, manually operable means for feeding an electrode to the arc, a master speed device, means whereby the operator may feed the electrode at a speed corresponding to that of the master speed device, and means for furnishing to the operator indications of different character when the electrode feed departs from the speed of the master speed device.

HARRY D. MORTON.